(12) United States Patent
Stenton

(10) Patent No.: US 8,174,749 B2
(45) Date of Patent: *May 8, 2012

(54) LIGHT-BEAM-SCANNING SYSTEM UTILIZING COUNTER-ROTATING PRISM WHEELS

(75) Inventor: Conrad Stenton, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/803,249

(22) Filed: Jun. 21, 2010

(65) Prior Publication Data

US 2010/0259807 A1   Oct. 14, 2010

Related U.S. Application Data

(62) Division of application No. 11/702,689, filed on Feb. 5, 2007, now Pat. No. 7,768,686.

(51) Int. Cl.
G02B 26/08 (2006.01)

(52) U.S. Cl. .................................. 359/211.3; 359/201.1

(58) Field of Classification Search .... 359/196.1–226.3, 359/831–837
See application file for complete search history.

(56) References Cited

U.S. PATENT DOCUMENTS

| | | |
|---|---|---|
| 1,520,384 A | 12/1924 | Bauersfeld |
| 1,647,631 A | 11/1927 | Ives |
| 1,947,668 A | 2/1934 | Warmisham |
| 2,124,139 A | 7/1938 | Eggert et al. |
| 2,928,952 A | 3/1960 | Bednarz |
| 3,030,856 A | 4/1962 | Jordan |
| 3,226,721 A | 12/1965 | Gould |
| 3,277,772 A | 10/1966 | Atwood |
| 3,434,785 A | 3/1969 | Weber |
| 3,619,033 A | 11/1971 | McMahon |
| 3,881,802 A | 5/1975 | Helava |
| 4,061,415 A | 12/1977 | Taenzer |
| 4,129,358 A | 12/1978 | Wei |
| 4,470,698 A | 9/1984 | Green, Jr. et al. |
| 4,620,235 A | 10/1986 | Watt |
| 4,698,498 A | 10/1987 | Mahoney et al. |
| 5,227,910 A | 7/1993 | Khattak |
| 5,321,259 A | 6/1994 | Morgan |
| 5,526,167 A | 6/1996 | Peng |
| 5,724,171 A | 3/1998 | Amos et al. |
| 6,340,588 B1 | 1/2002 | Nova et al. |
| 6,344,937 B1 | 2/2002 | Sparrold et al. |
| 6,678,095 B2 | 1/2004 | Kelly |
| 7,123,394 B2 | 10/2006 | Rahm et al. |

(Continued)

OTHER PUBLICATIONS

Office Action mailed Dec. 11, 2008 in connection with parent U.S. Appl. No. 11/702,689, filed Feb. 5, 2007.

(Continued)

Primary Examiner — Jennifer L. Doak
(74) Attorney, Agent, or Firm — Christie, Parker & Hale, LLP

(57) ABSTRACT

A light-beam-scanning system includes two counter-rotating prism wheels. Each prism wheel has a set of prisms at its periphery, selected so that prisms of equal half-angle deflections are sequentially aligned. A light transceiver structure directs a light beam parallel to the rotational axes of the prism wheels and at a distance from the rotational axes so that the light beam passes through the aligned prisms. A prism-wheel drive is operable to drive the prism wheels in opposite rotational directions.

24 Claims, 5 Drawing Sheets

U.S. PATENT DOCUMENTS

| | | |
|---|---|---|
| 7,190,535 B2 | 3/2007 | McClurg et al. |
| 7,244,028 B2 | 7/2007 | Govorkov et al. |
| 7,336,407 B1 | 2/2008 | Adams et al. |
| 7,359,103 B2 | 4/2008 | Kimura |
| 7,768,686 B2 * | 8/2010 | Stenton .................. 359/211.3 |
| 2003/0111534 A1 | 6/2003 | Hillman |
| 2004/0228014 A1 | 11/2004 | Kelly |
| 2006/0081844 A1 | 4/2006 | Hirosue et al. |

OTHER PUBLICATIONS

Office Action mailed May 7, 2009 in connection with parent U.S. Appl. No. 11/702,689, filed Feb. 5, 2007.

Office Action mailed Sep. 29, 2009 in connection with parent U.S. Appl. No. 11/702,689, filed Feb. 5, 2007.

* cited by examiner

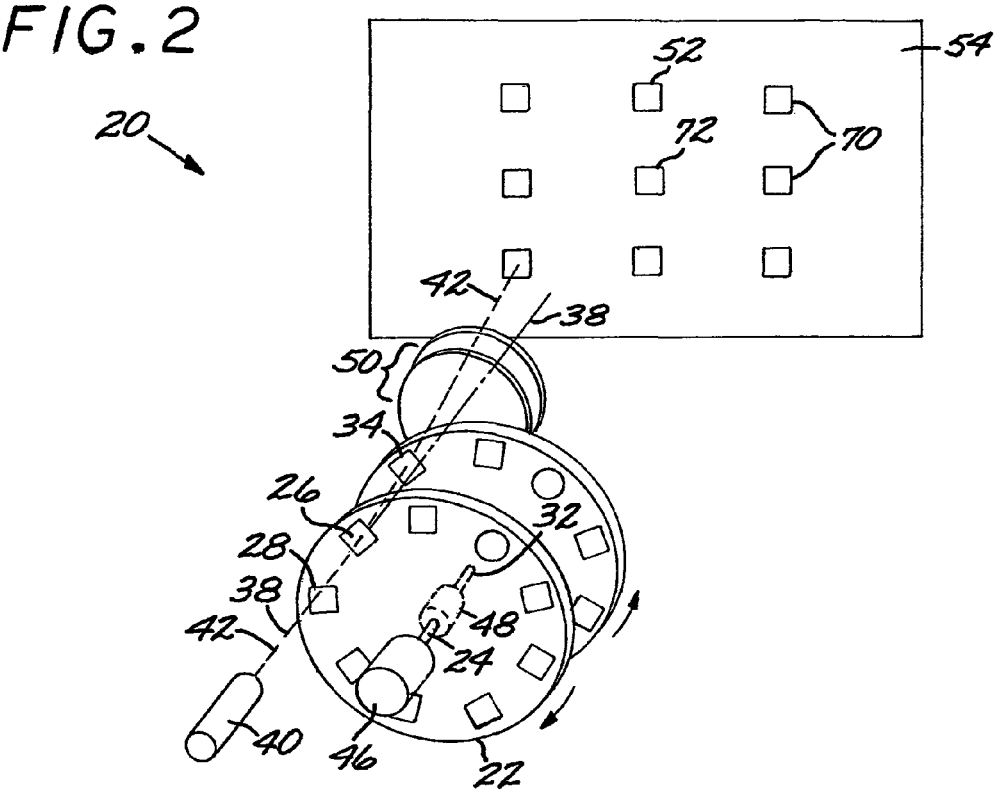
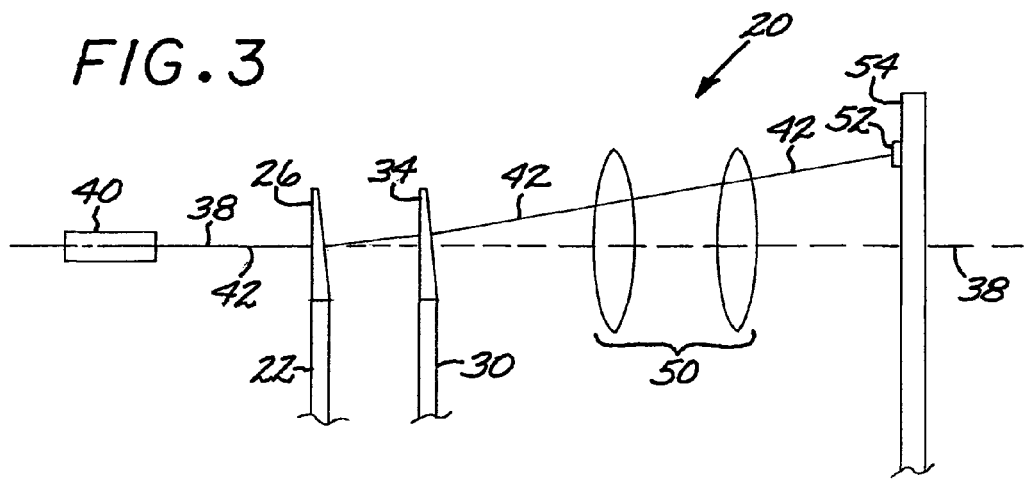

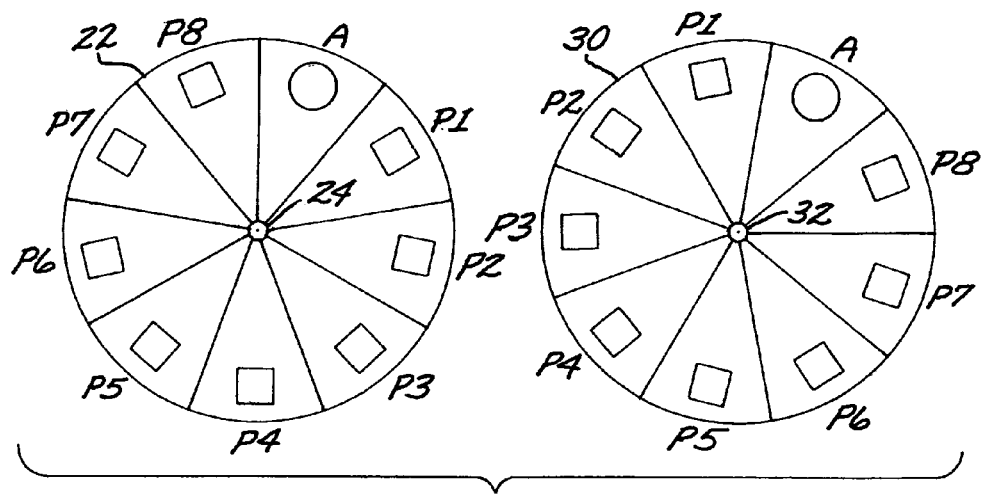
FIG. 7
FIG. 8
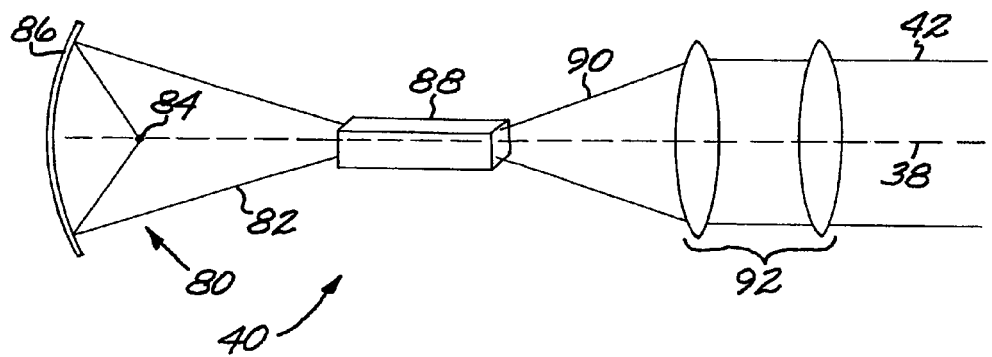

LIGHT-BEAM-SCANNING SYSTEM UTILIZING COUNTER-ROTATING PRISM WHEELS

REFERENCE TO RELATED APPLICATION

This Application is a Divisional of U.S. patent application Ser. No. 11/702,689, entitled LIGHT-BEAM-SCANNING SYSTEM UTILIZING COUNTER-ROTATING PRISM WHEELS filed Feb. 5, 2007 now U.S. Pat. No. 7,768,686 by Conrad Stenton, the teachings of which are incorporated herein by reference.

BACKGROUND OF THE INVENTION

1. Field of the Invention

The present invention relates to optical systems. More specifically, the present invention relates to light-beam scanning systems.

2. Description of the Related Art

Optical-beam scans are utilized in a number of applications. For example, two-dimensional, linear scans over an area are often required. These two-dimensional scans may be produced by deflecting a scanned beam in two dimensions (e.g., elevation and azimuth). Two-dimensional scans may also be generated by scanning a beam in one dimension, and then moving the entire beam-generating apparatus in the second dimension.

Most of the beam scans are performed in a continuously progressive, linear manner, in which the scanned beam is always active and is scanned in a continuous, linear pattern. However, for some applications a rastered scan is needed, in which the scanned beam is active only at specific points of a raster and not otherwise active. It may also be necessary that the beam does not follow a continuous, linear pattern. For example, in one type of a two-dimensional, 3×3 raster scan, a conventional continuous pattern would move the scanned beam linearly, for example from point (1,1) to point (1,2) to point (1,3) to point (2,1), etc. But it may be necessary in another specific application for the beam to scan nonlinearly, for example from point (2,1) to point (3,2) to point (1,2) to point (2,2), etc. and be active only when the beam is directed toward these points and not intermediately.

Although a discretely rastered, nonlinearly scanning apparatus may be possible using conventional technology, it would likely operate at a relatively slow rate. There is a need for a scanning apparatus that allows discrete rastered or non-rastered scanning in a nonlinear manner, at both slow and fast scanning rates. The present invention fulfills this need, and further provides related advantages.

SUMMARY OF THE INVENTION

The present invention provides a light-beam-scanning system that permits scanning in which the light beam is active only at the discrete angles and points of interest. The light-beam-scanning system permits linear scanning or, nonlinear scanning of the points. The scanning is repetitive, and in a highest-speed embodiment the order of the scanned points is not addressable except through an apparatus modification. In another, lower-speed embodiment, the scanning is linear or nonlinear, and the order of the scanned points is addressable.

In accordance with the invention, a light-beam-scanning system comprises a first prism wheel rotatable in a first rotational direction about a first rotational axis. The first prism wheel has at least two transmissive first-wheel prisms mounted at a first distance from the first rotational axis. A second prism wheel is rotatable in a second rotational direction opposite to the first rotational direction about a second rotational axis that is parallel to (and in some embodiments coincides with) the first rotational axis. The second prism wheel has at least two transmissive second-wheel prisms mounted at a second distance from the second rotational axis. The first rotational axis and the second rotational axis are positioned such that the first-wheel prisms and the second wheel prisms are in registry along a light-beam axis. The light-beam axis may be parallel or not parallel to the first rotational axis and the second rotational axis as the prism wheels rotate.

A light transceiver structure directs a light beam along the light-beam axis and through the first-wheel prisms and the second-wheel prisms (for use as a scanning output device), or receives a light beam along the light-beam axis after passing through the second-wheel prisms and the first-wheel prisms (for use as a scanning input device). The light-beam-scanning system may have both scanning output and scanning input capabilities. A prism-wheel drive is operable to drive the first prism wheel in the first rotational direction about the first rotational axis and the second prism wheel in the second rotational direction about the second rotational axis. With this prism-wheel drive, a first-aligned first-wheel prism and a respective first-aligned second-wheel prism are simultaneously aligned with the light beam at a first time, and a second-aligned first-wheel prism and a respective second-aligned second-wheel prism are simultaneously aligned with the light beam at a second time. Optionally, an optic is positioned along the light-beam axis so that the light beam passes through the optic after or before passing through the first-wheel prism and the second-wheel prism.

In a preferred embodiment, the first-aligned first-wheel prism and the first-aligned second-wheel prism are of equal beam half-angle-deflections. The second-aligned first-wheel prism and the second-aligned second-wheel prism are of equal second-beam half-angle-deflections different from the first-beam half-angle-deflections. Additionally, the first prism wheel may further include a first-wheel non-deflecting region at the first distance, and the second prism wheel may further include a second-wheel non-deflecting region at the second distance. The prism-wheel drive is operable to align the first-wheel non-deflecting region and the second-wheel non-deflecting region at a third time.

In one embodiment, the prism-wheel drive drives the first prism wheel and the second prism wheel continuously. In another embodiment, the prism-wheel drive drives the first prism wheel and the second prism wheel in a controllably and addressably stepwise manner. This embodiment allows the different beam deflections to be individually addressable.

In the application of most interest to the inventor, the light transceiver structure preferably comprises a light source producing an output beam, a light integrator that receives the output beam and produces an integrated beam of a selected cross-sectional shape such as a square beam, and a source optic that ensures that the integrated beam is afocal. In other applications, the light transceiver structure may instead or also comprise a light detector. The optic desirably comprises at least one optic lens.

In a particularly preferred form, a light-beam-scanning system comprises a first prism wheel rotatable in a first rotational direction about a first rotational axis. The first prism wheel has a plurality of transmissive first-wheel prisms mounted at a first distance from the first rotational axis. A second prism wheel is rotatable in a second rotational direction opposite to the first rotational direction about a second rotational axis that is parallel to (and in some embodiments coincides with) the first rotational axis. The second prism wheel has the same plurality of transmissive second-wheel prisms mounted at a second distance from the second rotational axis. The first rotational axis and the second rotational axis are positioned such that the first-wheel prisms and the second wheel prisms are in registry along a light-beam axis.

A light transceiver structure directs a light beam along the light-beam axis and through the first-wheel prisms and the second-wheel prisms. A prism-wheel drive is operable to drive the first prism wheel in the first rotational direction and the second prism wheel in the second rotational direction, so that an alignment sequence of pairs of first-wheel prisms and respective second-wheel prisms of equal half-angle deflection are simultaneously aligned along the light-beam axis. The sequential members of the pairs of first-wheel prisms and respective second-wheel prisms are of different half-angle deflections. An optic is positioned along the light-beam axis and through which the light beam passes after or before passing through the first-wheel prism and the second-wheel prism. Other compatible features discussed herein may be used with this embodiment as well.

Stated alternatively, a light-beam-scanning system comprises a pair of counter-rotating prism wheels that rotate in opposite directions about parallel axes of rotation. Each prism wheel has a set of transmissive prisms mounted thereon at a respective fixed distance from the respective axis of rotation. The set of prisms is selected such that prisms of equal half-angle deflections are sequentially aligned. A light transceiver structure directs a light beam parallel to the rotational axes and through one transmissive prism of each prism wheel. A prism-wheel drive is operable to counter-rotationally drive the first prism wheel and the second prism wheel to sequentially align first-wheel prisms and second-wheel prisms of equal half-angle deflection. There is an optic through which the light beam passes after passing through the first-wheel prism on the first wheel and the second-wheel prism on the second wheel.

The present approach rapidly scans a light beam discretely and repetitively over a rastered or nonrastered set of points (or, alternatively, scans light beams received from such a set of rastered or nonrastered set of points). Rastered points are located in a regular matrix array, whereas nonrastered points may be located in a nonregular manner. The scanning may be linear or nonlinear. Linear scanning involves moving from a point to a physically adjacent point, whereas nonlinear scanning involves moving from a point to a physically nonadjacent point. The scanning of the light beam may be performed with continuously moving, counter-rotating prism wheels, or with discretely stepping counter-rotating prism wheels.

The required beam deflection to a selected first point is achieved only when the respective pairs of prisms on the two prism wheels are aligned. Over the range of angular movement when two prisms of a pair are aligned, the continuing relative movement does not alter the total deflection of the light beam, and the deflected light beam remains steady on the particular point to which it is deflected according to the angles of the two prisms. The deviation in one direction of the light beam due to rotation of the first prism wheel is offset by the opposite deviation in the opposite direction due to the counter rotation of the second prism wheel.

That is, during the period of time when a first pair of prisms is intercepted by the light beam, the light beam is unwaveringly and steadily deflected through a first total angle (determined by the angles of the first prisms) and to (or from) a first point on a target surface. With continuing rotation, the first two prisms become non-aligned, and there is no through-transmission of the light beam. When a second pair of prisms is intercepted by the light beam, the light beam is unwaveringly and steadily deflected through a second total angle (determined by the angles of the second prisms) and to (or from) a second point on the target surface. The process repeats with continuing rotation of the prism wheels.

A desirable feature of the present approach is that the scanned light beam jumps from angle to angle and thence point to point, rather then moving continuously. In the example of the previous paragraph, the light beam is steadily first deflected to (or from) the first point for a first period of time. The light beam is then not passed through at all for a period of time. The light beam is then steadily second deflected to (or from) the second point for a second period of time. The jumping effect is achieved by using the two counter-rotating prism wheels. Consequently, the scanned light beam spot jumps from one point to the next point, rather than continuously sliding from one point to the next point. If maintaining the spatial resolution of the various points is important, as it is for many applications, the jumping effect maintains the illuminated points small and discrete, without a spatial broadening due to a sliding effect of the beam from point to point. Scanning systems that do not achieve this jumping effect (and are thence not within the scope of the present approach) and instead cause a sliding scanning of the light beam, suffer reduced spatial resolution of the individual points.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a perspective view of a physical embodiment of the light-beam scanning system of FIG. 1;

FIG. 3 is a schematic depiction of the light path in the physical embodiment of FIG. 2;

FIG. 7 depicts the arrangement of prisms on the two prism wheels;

FIG. 8 depicts an embodiment of the light transceiver structure;

DESCRIPTION OF THE INVENTION

Figure 1:
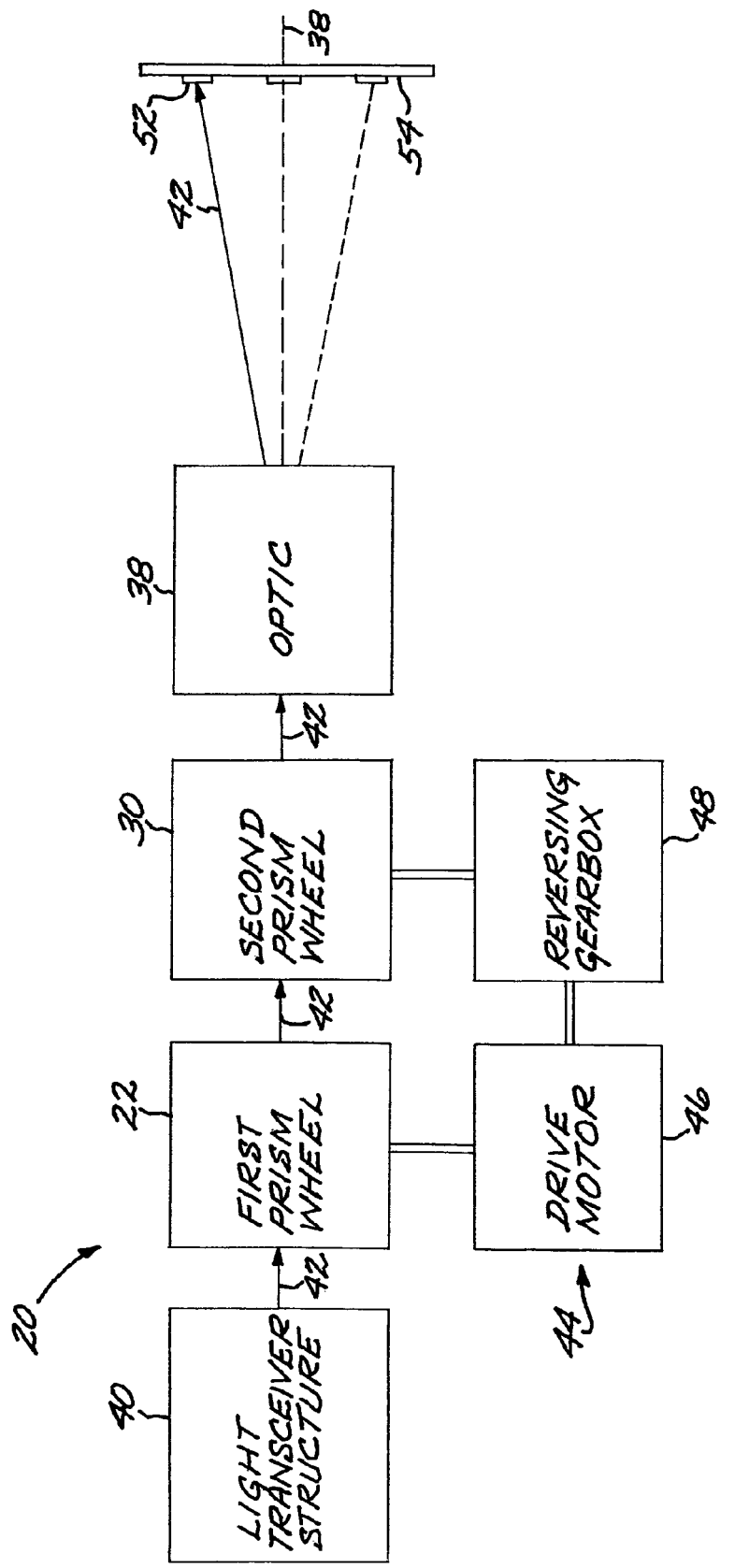
FIG. 1 is a block diagram of a light-beam scanning system in accordance with an illustrative embodiment of the present teachings.

FIG. 1 is a block diagram of a light-beam-scanning system 20 in accordance with an illustrative embodiment of the present teachings, FIG. 2 is a perspective view of a physical embodiment of the light-beam scanning system 20, and FIG. 3 depicts a light path through the light-beam scanning system 20.

The light-beam-scanning system 20 includes a first prism wheel 22 rotatable in a first rotational direction (e.g., clockwise) about a first rotational axis 24. The first prism wheel 22 has at least two, and typically a plurality of, transmissive first-wheel prisms 26 and 28 (FIG. 2) mounted at a first distance from the first rotational axis 24. There is a second prism wheel 30 rotatable in a second rotational direction (e.g., counter-clockwise) opposite to the first rotational direction about a second rotational axis 32 that is parallel to the first rotational axis 24. In the embodiment of FIG. 2, the second rotational axis 32 is coaxial (i.e., parallel to and coincident with) with the first rotational axis 24. The second prism wheel 30 has at least two, and typically a plurality of, transmissive second-wheel prisms 34 and 36 mounted at a second distance from the second rotational axis 32. In the embodiment of FIG. 2, where the first rotational axis 24 is coaxial with the second rotational axis 32, the first distance is equal to the second distance. The second prism wheel 30, like the first prism wheel 22, is opaque to the light beam except at those circumferential locations where wheel prisms are located.

Figure 4:
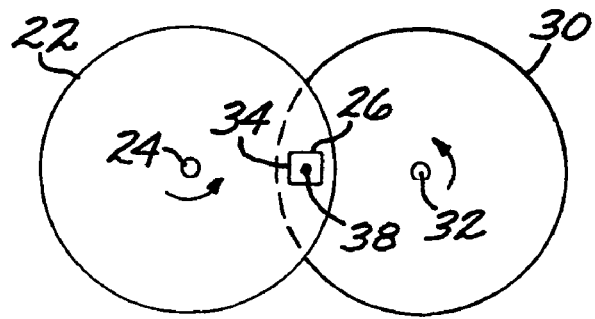
FIG. 4 depicts an alternative arrangement of the prism wheels to that shown in FIG. 2.

The rotational axes 24 and 32 of the embodiment of FIGS. 2-3 are not only parallel, but are coaxial as well. FIG. 4 illustrates an alternative approach, wherein the rotational axes 24 and 32 are parallel but not coaxial. This approach can be used as long as the prism wheels 22 and 30 overlap sufficiently to permit the light-beam axis 38 to pass simultaneously through the prisms 26 and 34 (and other respective pairs of prisms as the prism wheels rotate).

The first rotational axis 24 and the second rotational axis 32 are positioned such that the first-wheel prisms 26, 28 and the second wheel prisms 34, 36 are sequentially in registry (that is, are aligned) along a light-beam axis 38 that is parallel to the first rotational axis 24 and parallel to the second rotational axis 32 as the prism wheels 22 and 30 counter-rotate.

A light transceiver structure 40 directs a light beam 42 along the light-beam axis 38 and through the first-wheel prisms 26, 28 and the second-wheel prisms 34, 36, or, under reciprocal principles of optics, or receives the light beam 42 along the light-beam axis 38 after passing through the second-wheel prisms 34, 36 and the first-wheel prisms 26, 28. That is, the present light-beam-scanning system 20 may be either a scanning output device that directs the light beam outwardly from the system, or a scanning input device that receives the externally produced light beam, or it may perform both functions sequentially or simultaneously. The preferred application is to produce the light beam within the light-beam-scanning system 20 and to scan it outwardly, and that application will be emphasized in the subsequent discussion. At a moment in time as the prism wheels 22, 30 rotate, the light beam 42 simultaneously passes through exactly one of the first-wheel prisms 26 or 28, and through exactly one of the second-wheel prisms 34 or 36. There are other times when the light beam 42 does not pass through any of the wheel-mounted prisms.

A prism-wheel drive 44 is operable to drive the first prism wheel 22 in the first rotational direction about the first rotational axis 24 and the second prism wheel 30 in the second rotational direction about the second rotational axis 32. Any operable prism-wheel drive 44 may be used. In the embodiment of FIGS. 1-2, the prism-wheel drive 44 includes a drive motor 46 that directly drives the first prism wheel 22 in the first rotational direction. The drive motor 46 drives the second prism wheel 30 in the opposite second rotational direction through a reversing gearbox 48. This interlinking of the drives ensures a synchronized, but opposite, rotational movement of the prism wheels 22 and 30. A non-interlinked prism-wheel drive 44, such as a pair of stepper motors, may also be used, and in that case care must be taken to ensure the synchronization of the two prism wheels 22 and 30.

The prism-wheel drive 44 may be a continuous drive, so that the prism wheels 22 and 30 move counter-rotationally and continuously. The prism-wheel drive 44 may be a non-continuous drive, such as a stepper-motor drive, so that the prism wheels 22 and 30 move counter-rotationally and non-continuously. With the continuous drive, the order of the prisms that align with the light beam axis 38 is determined by their placement order on the respective prism wheels 22 and 30, and the scanning is necessarily repetitive with each rotation of the prism wheels 22 and 30. With the noncontinuous, non-interlinked prism-wheel drive 44, the order of the prisms that align with the light beam axis 38 is controllable, so that the scanning is addressable. By "addressable" is meant that the scanned points may be scanned in any order according to scanning commands provided to the prism-wheel drive 44. In noncontinuous scanning, the scanning is not necessarily repetitive with each rotation of the prism wheels 22 and 30. The noncontinuous scanning is typically at a slower scanning rate than the continuous scanning.

In all cases, the prism-wheel drive 44 operates such that a first-aligned first-wheel prism (e.g., prism 26) and a respective first-aligned second-wheel prism (e.g., prism 34) are simultaneously aligned with the light beam 42 along the light-beam axis 38 at a first moment in time. A second-aligned first-wheel prism (e.g., prism 28) and a respective second-aligned second-wheel prism (e.g., prism 36) are simultaneously aligned with the light beam 42 along the light-beam axis 38 at a second moment in time. The same operating principle of sequential pairwise alignment of prisms on the two counter-rotating prism wheels applies for additional prisms mounted to the prism wheels 22 and 30.

An optic 50 is optionally positioned along the light-beam axis 38 so that the light beam 42 passes through the optic 50 after (for a scanning output device) or before (for a scanning input device) it passes through the first-wheel prisms 26, 28 and the second-wheel prisms 34, 36. The optic 50 may form an image 52 of the light beam 42 at a target surface 54 (for a scanning output device), or form an image of the target surface 54 at the light transceiver structure 40 (in the case of a scanning input device) or have other optical effect on the light beam 42. The optic 50 may be of any operable type. FIGS. 2-3 depict the optic 50 as a refractive optic, specifically two lenses. However, the optic 50 may have a refractive optic of another type, a reflective optic, or a combination of reflective and refractive optical components.

Figure 5:
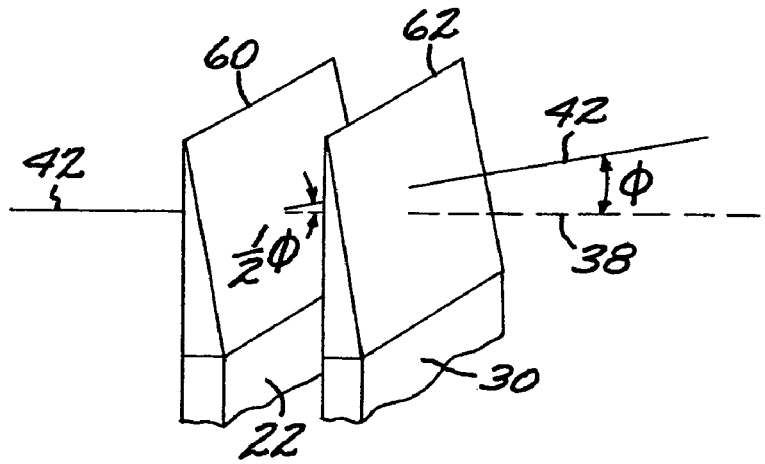
FIG. 5 is a perspective view of two prisms arranged to deflect the light beam along a first transverse axis.
Figure 6:
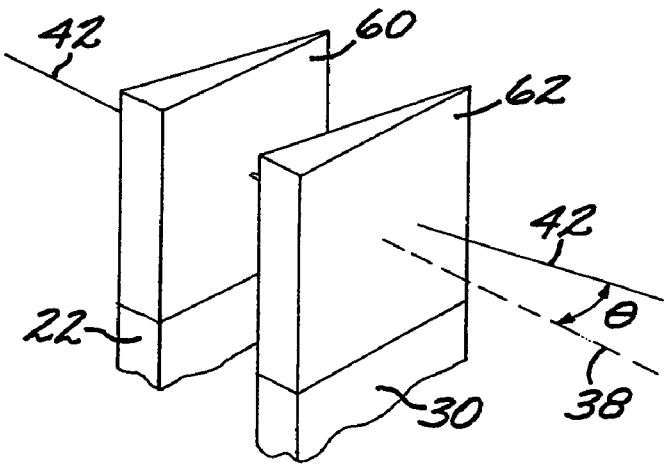
FIG. 6 is a perspective view of two prisms arranged to deflect the light beam along a second transverse axis.

FIGS. 5-6 illustrate the functioning of the two successive transmissive prisms, for elevational and azimuthal deflections. Upon passing through a first prism 60, mounted on the first prism wheel 22, the light beam 42 is deflected by a first deflection angle. The light beam 42 is again deflected as it passes through a second prism 62, mounted on the second prism wheel 30, by a second deflection angle. The two deflection angles are additive, so that the total deflection angle is the sum of the first deflection angle and the second deflection angle. It is preferred that, as shown, the first deflection angle is equal to the second deflection angle, so that each deflection angle is $\phi/2$ in elevation (FIG. 5) or $\theta/2$ in azimuth (FIG. 6), known as the half-angle deflection, and the total deflection angle is $\phi$ in elevation or $\theta$ in azimuth, known as the full-angle deflection, for each of the prism pairs. The magnitude of the deflection angle for each prism is determined by the material of construction and the geometry of the prism.

The prisms 60 and 62 are together oriented to establish the two-dimensional angular orientation of the deflection. In FIG. 5, the deflection $\phi$ of the light beam 42 is in the vertical plane (a vertical deflection). In FIG. 6, the prisms 60 and 62 are together rotated 90 degrees so that the deflection θ of the light beam 42 is in the horizontal plane (an azimuthal deflection). Other deflected orientations of the light beam 42 simultaneously with nonzero values of θ and φ may be achieved by orienting the prisms 60 and 62 appropriately at other angles.

Where there is a plurality of pairs of prisms that are brought into registry along the light-beam axis 38, each pair of aligned prisms typically has a different set of values (θ, φ), so that the light beam 42 is deflected to a corresponding set of points at the target surface 54. FIG. 2 depicts a 3×3 regular array of raster points as an example, although the use of the invention is not limited to regular arrays of raster points and may instead be used for irregular arrays of points. FIG. 7 depicts one form of the prism wheels 22 and 30 that may be used to scan the light beam 42 to these nine raster points (or to an irregular array of points).

The prism wheels 22 and 30 of FIG. 7 have mounted thereon at a distance D from their respective rotational axes 24 and 32 a plurality of pairs of prisms P1/P1, P2/P2, P3/P3, P4/P4, P5/P5, P6/P6, P7/P7, P8/P8. Because the prism wheels 22 and 30 rotate in opposite directions, the prisms are in the opposite order around the circumference in the two prism wheels 22 and 30. That is, the prisms are in the order P1, P2, P3, etc. proceeding clockwise on the prism wheel 22; and the prisms are in the order P1, P2, P3, etc. proceeding counterclockwise on the prism wheel 30.

Each pair of prisms on the two prism wheels 22 and 30 is matched according to the principles discussed in relation to FIGS. 5-6 to achieve the required (θ, φ) values for the eight raster points 70 other than the central raster point 72. The central raster point 72 is scanned by not deflecting the light beam 42. That is, there may be a non-deflecting region A on each of the prism wheels. The non-deflecting region A may be an unfilled aperture or a window made with a transmissive material. These non-deflecting regions A are aligned A/A in the same manner as discussed above for the prisms, at the appropriate time.

A feature of the present approach is that the light beam 42 need not be scanned to the raster points in a linear-scan manner. A "linear scan" as used herein means scanning a matrix of points in a linear order. Thus, for example, a scan in order of the nine raster points of FIGS. 2, (1,1) to (1,2) to (1,3) to (2,1) to (2,2) to (2,3) to (3,1) to (3,2) to (3,3), is one form of a linear scan. In the present approach, the order of the scan is determined by the (θ, φ) values for prisms P1/P1, P2/P2, etc. So, for example, the (θ, φ) values for P1/P1 could correspond to raster point (2,3), the (θ, φ) values of P2/P2 could correspond to raster point (1,1), the (θ, φ) values for P3/P3 could correspond to raster point (3,3), etc. That is, the present approach may be used to achieve either linear or nonlinear scanning according to the selection of the order of the paired prisms. If a noncontinuous prism-wheel drive 44 is used, the scan of the raster points may be in any order and may be addressed by selectively controlling the prism-wheel drive 44.

FIG. 8 depicts a preferred form of the light transceiver structure 40 for a scanning output device. The light-source structure 40 includes a light source 80 producing an output beam 82. The light source 80 may be of any type, but is illustrated as an arc source 84 whose output is directed by a source mirror 86. The output beam 82 is directed onto an input end of a light integrator 88 that receives the output beam and produces an integrated beam 90. The light integrator 88 may be a light pipe in which uniformity of intensity is achieved by multiple internal reflections. The light integrator 88 may be of any desired cross sectional shape. For example, a cylindrical light integrator 88 produces an integrated beam 90 of round cross-sectional shape. A square-prismatic light integrator 88 produces an integrated beam 90 of square cross-sectional shape. This approach to shaping the cross-sectional shape of the light beam 42 is preferred to the use of an aperture or the like, because no light energy is lost with the present approach. The integrated beam 90 is made afocal (i.e., imaged to infinity) by a source optic 92, here depicted as a pair of lenses, resulting in the light beam 42. Where the light-beam-scanning system 20 is an input device that receives an externally produced light beam, the light transceiver structure 40 instead includes a light detector such as an imaging focal plane array or other type of light detector.

Figure 9:
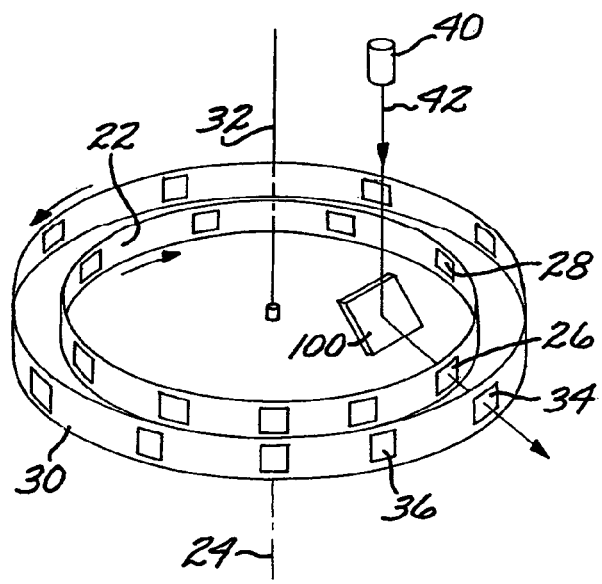
FIG. 9 is a schematic perspective view of another embodiment of the light-beam scanning system of FIG. 1.
Figure 10:
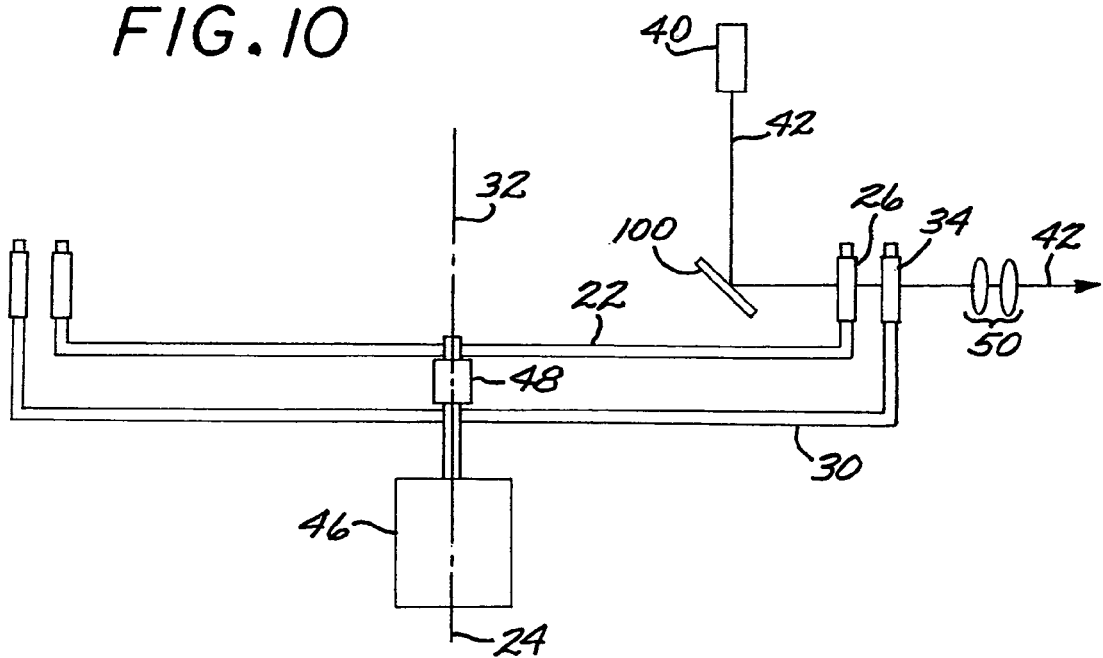
FIG. 10 is a schematic sectional view of the embodiment of FIG. 9, taken along line 10-10.

The preceding discussion has related to the embodiment, such as that of FIG. 2, wherein the light beam 42 is directed parallel to the rotational axes 24 and 32. However, other geometries may be used, and FIGS. 9-10 schematically illustrate one such alternative geometry. Since the principles are the same as the embodiment of FIG. 2, the same reference numerals are used where applicable. The prism wheels 22 and 30 rotate in opposite directions about the first rotational axis 24 in this embodiment. First wheel prisms 26 and 28 are mounted to the first prism wheel 22, and second wheel prisms 34 and 36 are mounted to the second prism wheel 30. Whereas the wheel prisms are mounted flush with the planes of their respective prism wheels in the embodiment of FIG. 2, the wheel prisms are mounted perpendicular to the planes of their respective prism wheels in the embodiment of FIGS. 9-10. The light beam 42 initially propagates parallel to the first rotational axis 24, but then reflects from a stationary unpowered fold mirror 100 to propagate parallel to the plane of the prism wheels 22 and 30. The light beam 42 passes through the wheel prisms (e.g., 26, 34) as in the embodiment of FIG. 2. Continued counter-rotation of the prism wheels 22 and 30 brings new pairs of wheel prisms into alignment with the light beam 42. The embodiment of FIGS. 9-10 uses other components as described in relation to the other embodiments, such as the light transceiver structure 40 and the optic 50. Yet other operable configurations may be utilized as well.

Although a particular embodiment of the invention has been described in detail for purposes of illustration, various modifications and enhancements may be made without departing from the spirit and scope of the invention. Accordingly, the invention is not to be limited except as by the appended claims.

Accordingly,
What is claimed is:
1. A system for scanning a light beam comprising:
a first wheel rotatable in a first rotational direction about a first rotational axis;
plural first prisms mounted on said first wheel, each first prism adapted to deflect said beam by a respective first predetermined angle;
a second wheel rotatable in a second rotational direction about a second rotational axis;
plural second prisms mounted on said second wheel, each second prism adapted to deflect said beam by a respective second predetermined angle and each respective one of said second prisms forming a pair with a respective one of said first prisms, whereby in relative alignment each said pair of first and second prisms deflects said beam by a respective total angle in elevation and azimuth relative to a point of interest; and
first means for rotating said first wheel in said first rotational direction about said first rotational axis and said second wheel in said second rotational direction about said second rotational axis, such that each said pair of first and second prisms is successively aligned with said beam, thereby scanning said beam over each said total angle of deflection.

2. The invention of claim 1 wherein each said respective second prism is adapted to offset a deviation of said beam by said respective first prism due to rotation of said first prism wheel such that said respective total angle of deflection remains constant over a range of angular movement of said first and second wheels when said respective first and second prisms are aligned.

3. The invention of claim 2 wherein said respective first predetermined angle is equal to said respective second predetermined angle for each said pair of first and second prisms.

4. The invention of claim 1 wherein each said pair of first and second prisms is adapted to effect a unique total angle of deflection.

5. The invention of claim 1 wherein said first wheel includes a first non-deflecting region and said second wheel includes a second non-deflecting region, whereby in relative alignment said first and second non-deflecting regions transmit said beam with no deflection.

6. The invention of claim 1 wherein said each first prism is mounted on said first wheel at a first predetermined distance from said first rotational axis and each second prism is mounted on said second wheel at a second predetermined distance from said second rotational axis.

7. The invention of claim 6 wherein said first predetermined distance is equal to said second predetermined distance.

8. The invention of claim 1 wherein said first rotational direction is opposite said second rotational direction.

9. The invention of claim 8 wherein said first rotational axis is parallel to said second rotational axis.

10. The invention of claim 9 wherein said first rotational axis is coaxial with said second rotational axis.

11. The invention of claim 9 wherein said first rotational axis is parallel to but not coaxial with said second rotational axis.

12. The invention of claim 9 wherein said beam is parallel to said first and second rotational axes when said beam passes through said first and second wheels.

13. The invention of claim 9 wherein said beam is perpendicular to said first and second rotational axes when said beam passes through said first and second wheels.

14. The invention of claim 1 wherein the rotation of said first and second wheels is synchronized.

15. The invention of claim 1 wherein the rotation of said first and second wheels is continuous.

16. The invention of claim 1 wherein said first and second wheels are rotated in a stepwise manner.

17. The invention of claim 1 wherein said first means includes a drive motor adapted to directly drive said first wheel.

18. The invention of claim 17 wherein said first means further includes a reversing gearbox coupled to said drive motor and adapted to drive said second wheel.

19. The invention of claim 1 wherein said pairs of first and second prisms are adapted to sequentially form a rectilinear array of scanned light beams.

20. A beam scanning system comprising:
a light transceiver for providing or receiving a light beam;
a first wheel rotatable in a first rotational direction about a first rotational axis;
plural first prisms mounted on said first wheel, each first prism adapted to deflect said beam by a respective first predetermined angle;
a second wheel rotatable in a second rotational direction about a second rotational axis;
plural second prisms mounted on said second wheel, each second prism adapted to deflect said beam by a respective second predetermined angle and each respective one of said second prisms forming a pair with a respective one of said first prisms, whereby in relative alignment each said pair of first and second prisms deflects said beam by a respective total angle in elevation and azimuth relative to a point of interest; and
a drive for rotating said first wheel in said first rotational direction about said first rotational axis and said second wheel in said second rotational direction about said second rotational axis, such that each said pair of first and second prisms is successively aligned with said beam, thereby scanning said beam over each said total angle of deflection.

21. The invention of claim 20 wherein said light transceiver includes a light source for providing an output beam.

22. The invention of claim 21 wherein said light transceiver further includes a light integrator for receiving said output beam and producing an integrated beam having a desired cross-sectional shape.

23. The invention of claim 22 wherein said light transceiver further includes a source optic for making said integrated beam afocal.

24. A method for scanning a light beam including the steps of:
providing a first wheel rotatable in a first rotational direction about a first rotational axis;
mounting plural first prisms on said first wheel, each first prism adapted to deflect said beam by a respective first predetermined angle;
providing a second wheel rotatable in a second rotational direction about a second rotational axis;
mounting plural second prisms on said second wheel, each second prism adapted to deflect said beam by a respective second predetermined angle and each respective one of said second prisms forming a pair with a respective one of said first prisms, whereby in relative alignment each said pair of first and second prisms deflects said beam by a respective total angle in elevation and azimuth relative to a point of interest; and
rotating said first wheel in said first rotational direction about said first rotational axis and said second wheel in said second rotational direction about said second rotational axis, such that each said pair of first and second prisms is successively aligned with said beam, thereby scanning said beam over each said total angle of deflection.

* * * * *